A. E. MARKWELL.
BEVELED RULE MOLDING DEVICE.
APPLICATION FILED AUG. 14, 1913.
1,096,789.
Patented May 12, 1914.
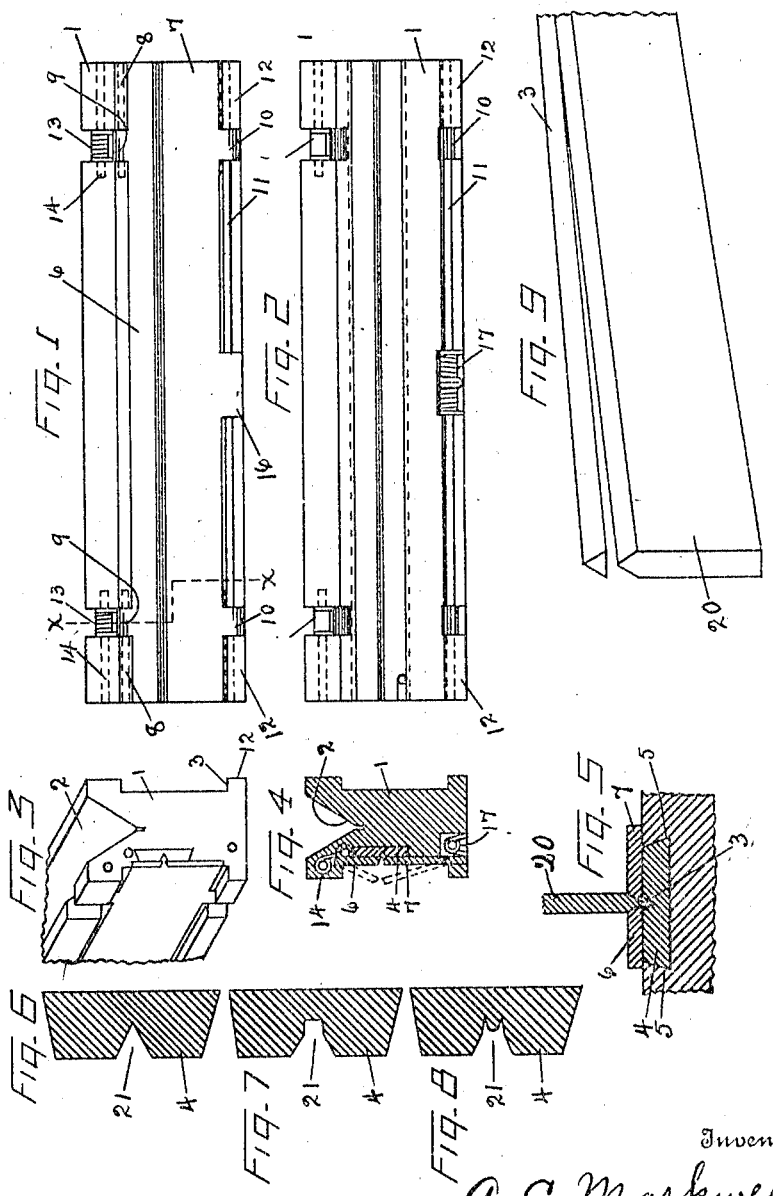

UNITED STATES PATENT OFFICE.

ANDREW E. MARKWELL, OF FORT WORTH, TEXAS, ASSIGNOR OF ONE-HALF TO C. W. STANTON, OF FORT WORTH, TEXAS.

BEVELED-RULE-MOLDING DEVICE.

1,096,789.

Specification of Letters Patent.

Patented May 12, 1914.

Application filed August 14, 1913. Serial No. 784,692.

*To all whom it may concern:*

Be it known that I, ANDREW E. MARKWELL, a citizen of the United States, residing at Fort Worth, in the county of Tarrant and State of Texas, have invented certain new and useful Improvements in Beveled-Rule-Molding Devices, of which the following is a specification.

My invention relates to improvements in matrices and more particularly to devices which are similar to matrices which are used in linotype and intertype or line casting machines, and which are adapted to mold the small triangular rules which are used in printing and the object is to provide simple devices which can be operated by matrix molding devices for forming rules for printing purposes.

Another object is to provide simple molding devices for forming triangular rules on the edges of slugs similar to the line cast slugs which are produced by linotype or intertype or line casting machines and to form the triangular rules with such slender connection to the slugs that the rules can be readily broken from the slugs. Such rules can be manufactured at very small cost,—at much smaller cost than the printing rules now in use. When the rules are broken from the edges of the slugs the slugs may be discarded and thrown into the melting pot to be re-melted, the sole object of this invention being to obtain the triangular rules or other rules without wasting any great quantity of material. The slugs from which the rules are broken are not lost but are used again after being re-melted.

Other objects and advantages will be fully explained in the following description and the invention will be more particularly pointed out in the claims.

Reference is had to the accompanying drawings which form a part of this application.

Figure 1 is a side elevation of a matrix molding device for molding beveled rules. Fig. 2 is a similar view with the hinge plates detached to expose the angular groove in which the bevel rule is formed. Fig. 3 is a broken perspective view of one of the rule molding devices. Fig. 4 is a cross section taken substantially on the line x—x of Fig. 1. Fig. 5 is a cross section of a molding device showing the position of the die in which the rule is formed, also showing the position of the slug to the rule and showing the hinge plates on each side of the slug. Figs. 6, 7, and 8 show enlarged views of dies for making different styles of bevel rules. Fig. 9 is a broken view of the slug, showing the beveled rule partly detached therefrom.

Similar characters of reference are used to indicate the same parts throughout the several views.

A block 1 having the general design of blocks in common use, is provided. The block 1 has the usual angular groove 2 and the cutout 23 in the rear side. The rules, or the bevel rules, 3 are formed in dies 4 and the dies 4 are mounted in the blocks 1 by cutting a channel longitudinally through the block 1, which channel has under cut edges 5 to receive the dies 4. Temporary molding wings 6 and 7 are hingedly connected to the block 1 and these wings may be swung open so that the dies 4 can be inserted and removed. The wing 6 is pivotally connected to the upper part of block 1 by the pivot bolts 8. The wings 6 have extensions 9 and the bolts 8 are extended through the parts or lips 9. The wings 7 have downward extensions 10 and a single pivot rod 11 extends through the lips 10 to hinge the wings 7 to the block 1. The rod 11 extends through parts 12 of the block 1. The wings 6 are normally pressed against the block 1 and the die 4 by springs 13 which have one end attached to the block 1 and the other end attached to rods 14. The rod 11 which attaches wings 7 to the block is anchored in parts 12 of the block 1. The wing 7 has a downwardly extending lip 16, and a spiral spring 17 presses against that part of the lip 16 which is back of the pivot point or rod 11, that is, the lip 16 extends farther down than the rod 11 so that the spring 17 will press outwardly on the lip 16, and thus hold the wing 7 securely against the body 1. The wings 6 and 7 are then yieldingly connected to the block 1 and inclose a die 4 which is mounted in a channel inside of the block 1 and is held in there by the under cut edges of the channel. The wings 6 and 7 thus serve to make the part of the metal which connects the rule 3 with the slug 20 very thin so that the rule 3 can be easily detached from the slug 20.

The die 4 may have any suitable channel cut therein for molding rules of suitable design. Figs. 6 to 8 show dies with different forms of grooves 21 therein. Any variety of printing edge or face may be formed on the rule by making the desired shape of groove in the die 4.

What I claim, is,—

1. A rule molding mechanism comprising a bar having the general contour of a matrix and having a channel in one side with under cut edges, a die dovetailed in said channel and having the outer surface flush with the adjacent surface of said bar and having an angular groove in the outer face thereof, and hinged members on said bar inclosing said die and terminating with bevel edges in close proximity to each other over said angular groove.

2. A rule molding mechanism comprising a bar having the general contour of a matrix and having a channel in one side with under cut edges, a die dovetailed in said channel and having the outer surface flush with the adjacent surface of said bar and having an angular groove in the outer face thereof, forming members hingedly connected to said block and inclosing said die and terminating with beveled faces in close proximity to each other, and means for holding said members yieldingly against said die.

3. A rule molding mechanism comprising a bar having a flat face and a channel in said face with undercut edges, a die dovetailed in said channel and having a groove therein, and plates hingedly connected to said bar and inclosing said die and terminating with beveled faces converging toward said groove and leaving a narrow space connecting the converging space between said plates and said groove.

4. A rule molding mechanism comprising a bar having a flat face and a channel in said face with undercut edges, a die dovetailed in said channel and having a groove therein and having the outer face flush with the face of said bar, plates hingedly connected to said bar and terminating with beveled edges converging toward said groove and leaving a narrow space between the edges of said plates which connects the converging space between said plates with said groove, and springs for holding said plates yieldingly against said die.

5. A rule molding mechanism comprising a bar having a flat face provided with a groove therein to receive molten material for forming a rule, plates hingedly connected to said bar and terminating with beveled edges in close proximity to each other and leaving a narrow converging space between said edges to connect the converging space between said beveled edges with the space in said groove, and means for holding said plates yieldingly against the flat face of said bar and partly closing said groove.

In testimony whereof, I set my hand in the presence of two witnesses, this 2nd day of August, 1913.

ANDREW E. MARKWELL.

Witnesses:
 A. L. JACKSON,
 J. W. STITT.